3,454,522
BLACK POLYETHYLENE COMPOSITIONS STABILIZED AGAINST ULTRA-VIOLET LIGHT DEGRADATION WITH A SYNERGISTIC MIXTURE OF CARBON BLACK AND A DIESTER OF 3,3-THIODIPROPIONIC ACID
Clarence E. Tholstrup, Kingsport, Tenn., assignor to Eastman Kodak Company, Rochester, N.Y., a corporation of New Jersey
No Drawing. Filed Oct. 23, 1959, Ser. No. 848,186
Int. Cl. C08f 45/56, 45/58
U.S. Cl. 260—41       9 Claims This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, oftentimes expose the poly-α-olefin to elevated temperatures. To minimize oxidative deterioration in poly-α-olefins, antioxidants or stabilizers are oftentimes incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of materials that improve the stability of the polyethylene and polypropylene composi- elevated temperatures.

It is likewise an object of this invention to improve by novel means the thermal properties of black poly-α-olefins.

Other objects of the invention will be apparent from the description and claims that follow.

The present invention comprises poly-α-olefin compositions having incorporated therein a stabilizer combination of a diester of 3,3'-thiodipropionic acid and carbon black.

The diester of 3,3'-thiodipropionic acid comprising the present stabilizer combination has the following formula

wherein R is an alkyl radical having 4 to 20 carbon atoms, and perferably 8 to 18 carbon atoms. A particularly effective ester has twelve carbon atoms for the R substituent, namely, dilauryl-3,3'-thiodpropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl, and eicosyl diesters of 3,3'-thiodipropionic acid, or mixtures thereof.

The carbon black or powdered carbon of the present stabilizer combination is desirably in particles less than 500 millimicrons, and preferably in particles 5 to 200 millimicrons in diameter. The carbon blacks suitable for use in the invention are those powdered carbons conventionally used to pigment polyethylene including acetylene blacks, channel blacks and lamp blacks.

The combination of the described diesters of 3,3'-thiodipropionic acid and carbon black can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1) and the like can also be stabilized with the subject stabilizer combinations. Both the so-called "low density" and "high density" poly-α-olefin compositions can be stabilized in accordance with the invention. Reference is made to Fawcett et al. U.S. Patent No. 2,153,553, granted Apr. 11, 1939, and to copending applications Coover U.S. Ser. No. 559,536, filed Jan. 17, 1956, and Coover et al. U.S. Ser. No. 724,904, filed March. 31, 1958, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the carbon black employed in poly-α-olefin compositions in accordance with the invention can be widely varied, the stabilizing amount of this combination usually varying with the particular use to which the poly-α-olefin compositions are to be put. Concentrations of about .001% to 10% for each component of the stabilizer combination are generally used, with about .01% to 3% of the diester of 3,3'-thiodipropionic acid and about .01% to 5% of the carbon black being preferred, the concentration being based on the weight of the poly-α-olefin. While the proportions of the stabilizer components compromising the present stabilizer combinations can be widely varied within the above ranges, we generally utilize the combination of the subject stabilizers at a weight ratio of the diester of 3,3'-thiodipropionic acid to the carbon black in the range of 1/100 to 100/1, although a higher proportion of carbon than diester of 3,3'-thiodipropionic acid is preferably utilized.

The stabilizer combinations of the invention can be incorporated or blended into poly-α-olefin compositions by the conventional methods utilized for blending such materials into resins or plastics. Typical of such methods that can be suitably employed include milling on heated rolls, dry blending and related blending methods. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3′-thiodipropionic acid and carbon black are synergistic combinations, namely, the stabilizing effect of such combinations in poly-α-olefins is substantially greater than the additive effect of the individual stabilizers of the combination.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, P=8S, where S is the number of milliliters of 0.002 N sodium thiosulfate used.

EXAMPLE 1

The synergistic effect of several dialkyl-3,3′-thiodipropionates and powdered carbon in polyethylene was determined. Various amounts of dialkyl-3,3′-thiodipropionates and carbon black were blended into hot polyethylene to make up 150 gram batches on a rubber mill using standard milling procedures. The resulting milled polyethylene compositions were then molded into plates (5″ x 6″ x 1/16″). Portions of the molded plates were evaluated for thermal stability by the 160° C. oven storage test described above. The polyethylene employed was solid plastic grade having an average molecular weight greater than 15,000, a melt index of 7.59 and a density of about .91. The carbon black employed had a particle size of 18–22 millimicrons. The results of the 160° C. oven storage test are summarized by the data set out in the table below. The amounts of additive set out in the table are expressed in amount by weight based on the weight of the polyethylene.

TABLE

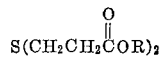

| R | Conc., percent | Carbon black, conc., percent | Oven life at 160°C., hours |
|---|---|---|---|
| | 0 | 0 | 3 |
| Lauryl | 0.05 | 0 | 6 |
| Do | 0.10 | 0 | 15 |
| n-Octyl | 0.10 | 0 | 15 |
| n-Octadecyl | 0.10 | 0 | 7 |
| | 0 | [1]3 | 15 |
| | 0 | [2]3 | 12 |
| Lauryl | 0.05 | [1]3 | 40 |
| Do | 0.10 | [1]3 | >100 |
| n-Octyl | 0.10 | [1]3 | >100 |
| n-Octadecyl | 0.10 | [1]3 | 40 |
| Lauryl | 0.05 | [2]3 | >150 |

[1] "Witco 100," Witco Chemical Co.
[2] "Witco 32," Witco Chemical Co.

A combination of 0.10% by weight of a well-known stabilizer, zinc di-n-butyldithiocarbamate, and 3% by weight of carbon black did not form a synergistic combination in polyethylene when tested as described above.

EXAMPLE 2

A 0.10% by weight portion of dilauryl-3,3′-thiodipropionate in combination with a 3% by weight portion of carbon black having a particle size of 18–22 millimicrons is an effective synergistic stabilizer combination when incorporated into solid polypropylene having an average molecular weight of about 110,000 and a density of .91, when prepared in test samples, exposed and tested as described in Example 1.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

I claim:
1. A solid poly-α-olefin composition comprising solid polyethylene containing a stabilizer combination comprising about .01% to 3% by weight based on said polyethylene of a diester of 3,3′-thiodipropionic acid having the formula

$$S(CH_2CH_2\overset{O}{\overset{\|}{C}}OR)_2$$

wherein R is an alkyl radical having 8 to 18 carbon atoms, and about .01% to 5% by weight based on said polyethylene of carbon black in particles 5 to 200 millimicrons in size.

2. A solid poly-α-olefin composition comprising solid polyethylene containing a stabilizer combination comprising about .01% to 3% by weight based on said polyethylene of dilauryl-3,3′-thiodipropionate and about .01% to 5% by weight based on said polyethylene of carbon black in particles 5 to 200 millimicrons in size.

3. A solid poly-α-olefin composition comprising solid polyethylene containing a stabilizer combination comprising about .01% to 3% by weight based on said polyethylene of di(n-octyl)-3,3′-thiodipropionate and about .01% to 5% by weight based on said polyethylene of carbon black in particles 5 to 200 millimicrons in size.

4. A solid poly-α-olefin composition comprising solid polyethylene containing a stabilizer combination comprising about .01% to 3% by weight based on said polyethylene of di(n-octadecyl)-3,3′-thiodipropionate and about .01% to 5% by weight based on said polyethylene of carbon black in particles 5 to 200 millimicrons in size.

5. A solid poly-α-olefin composition comprising solid polyethylene containing a stabilizer combination comprising about .01% to 3% by weight based on said polyethylene of dilauryl-3,3′-thiodipropionate and about .01% to 5% by weight based on said polyethylene of carbon black having a particle size of about 18 to 22 millimicrons.

6. A composition comprising polyethylene and a synergistic stabilizing amount of a stabilizer combination comprising (A) a diester of 3,3′-thiodipropionic acid having the formula

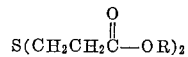

$$S(CH_2CH_2\overset{O}{\overset{\|}{C}}-OR)_2$$

wherein each R is an alkyl radical having 4 to 20 carbon atoms, and (B) carbon black particles, the weight ratio of the diester of 3,3′-thiodipropionic acid to carbon black particles being in the range of .01/5 to 3/.01.

7. A composition comprising polyethylene and a stabilizer combination comprising 0.01% to 3% by weight based on said polyethylene of a diester of 3,3'-thiodipropionic acid having the formula

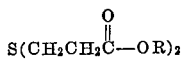

wherein each R is an alkyl radical having 4 to 20 carbon atoms, and 0.01% to 5% by weight based on said polyethylene of carbon black particles.

8. A composition according to claim 7 wherein said carbon black particles are less than 500 millimicrons in size.

9. A composition comprising polyethylene and a synergistic stabilizing amount of a stabilizer combination comprising (A) dilauryl 3,3'-thiodipropionate, and (B) carbon black particles less than 500 millimicrons in size, the weight ratio of dilauryl 3,3'-thiodipropionate to carbon black particles being in the range of .01/5 to 3/.01.

References Cited
UNITED STATES PATENTS

| | | | |
|---|---|---|---|
| 2,512,459 | 6/1950 | Hamilton | 260—41 |
| 2,727,879 | 12/1955 | Vincent | 260—41 |
| 2,519,755 | 8/1950 | Gribbins | 260—45.85 |
| 2,967,845 | 1/1961 | Hawkins et al. | 260—41 |
| 2,889,306 | 6/1959 | Hawkins et al. | 260—41 |
| 2,967,846 | 1/1961 | Hawkins et al. | 260—41 |
| 2,967,847 | 1/1961 | Hawkins et al. | 260—41 |
| 2,967,848 | 1/1961 | Hawkins et al. | 260—41 |
| 2,967,849 | 1/1961 | Hawkins et al. | 260—41 |
| 2,967,850 | 1/1961 | Hawkins et al. | 260—41 |

ALLAN LIEBERMAN, *Primary Examiner.*

U.S. Cl. X.R.

260—45.85